US012746833B2

(12) United States Patent
Luedtke et al.

(10) Patent No.: US 12,746,833 B2
(45) Date of Patent: Sep. 29, 2026

(54) DC-DC BOOST SYSTEM AND METHODS FOR RECHARGING HIGHER VOLTAGE BATTERY PACKS WITH LESSER RATED CHARGING STATIONS

(71) Applicant: FCA US LLC, Auburn Hills, MI (US)

(72) Inventors: Daniel R Luedtke, Beverly Hills, MI (US); Daniel Roiu, Turin (IT); Kaveh Razi Kamanaj Olia, Turin (IT); Bingen Wang, Okemos, MI (US)

(73) Assignee: FCA US LLC, Auburn Hills, MI (US)

( * ) Notice: Subject to any disclaimer, the term of this patent is extended or adjusted under 35 U.S.C. 154(b) by 775 days.

(21) Appl. No.: 18/306,507

(22) Filed: Apr. 25, 2023

(65) Prior Publication Data

US 2024/0359572 A1 Oct. 31, 2024

(51) Int. Cl.
*B60L 53/10* (2019.01)
*B60L 50/51* (2019.01)
(Continued)

(52) U.S. Cl.
CPC ............... *B60L 53/11* (2019.02); *B60L 50/51* (2019.02); *B60L 53/53* (2019.02); *H02J 7/60* (2026.01);
(Continued)

(58) Field of Classification Search
CPC .......... B60L 53/11; B60L 50/51; B60L 53/53; B60L 2210/14; B60L 2210/40;
(Continued)

(56) References Cited

U.S. PATENT DOCUMENTS 10,131,239 B2 11/2018 Herke et al.
10,186,950 B2 * 1/2019 Wolf ........................ H01F 27/24
(Continued)

FOREIGN PATENT DOCUMENTS

| | | | | | |
|---|---|---|---|---|---|
| CA | 3223051 | A1 * | 1/2023 | .............. B60L 55/00 |
| DE | 102022210343 | A1 * | 4/2024 | .......... H02M 7/5387 |
| EP | 3552294 | A1 | 10/2019 | |

OTHER PUBLICATIONS

YouTube Video—Renault Zoe EV Battery Charger Block (BCB); https://www.youtube.com/watch?v=argrHjADn8g; Mar. 13, 2020; screenshot and video retrieved from the Internet Apr. 2, 2023.

*Primary Examiner* — M Baye Diao
(74) *Attorney, Agent, or Firm* — Jeremy J. Klobucar

(57) ABSTRACT

Direct current to direct current (DC-DC) boosting and fast charging techniques for an electrified vehicle include providing relay switches electrically connected between a DC charging station rated at a first voltage, an inverter, and a high voltage (HV) battery system rated at a higher second voltage, wherein at least one of the plurality of relay switches is connected to a midpoint of one of three inductor phase legs of the inverter and controlling a boosted fast charging mode wherein the plurality of relay switches are opened/closed such that the first voltage is provided to the inverter and to the HV battery system for recharging, wherein the inverter and the electric motor utilize a first alternating current (AC) phase current based on the first
(Continued)

voltage to inductively generate and convert two AC phase currents to a third DC voltage for further boosted recharging of the HV battery system.

16 Claims, 5 Drawing Sheets

(51) Int. Cl.
*B60L 53/53* (2019.01)
*H02J 7/60* (2026.01)
*H02J 7/90* (2026.01)

(52) U.S. Cl.
CPC ............. *H02J 7/90* (2026.01); *B60L 2210/14* (2013.01); *B60L 2210/40* (2013.01)

(58) Field of Classification Search
CPC ... B60L 53/22; B60L 53/24; H02J 7/60; H02J 7/90; H02J 2207/20; Y02T 10/70; Y02T 10/7072
USPC .......................................................... 320/109
See application file for complete search history.

(56) References Cited

U.S. PATENT DOCUMENTS

| | | | | |
|---|---|---|---|---|
| 10,283,990 | B2 | 5/2019 | Fuchs et al. | |
| 10,358,041 | B2 * | 7/2019 | Lee | B60L 53/11 |
| 10,391,870 | B2 | 8/2019 | Götz et al. | |
| 10,471,837 | B2 | 11/2019 | Herke et al. | |
| 10,771,001 | B2 | 9/2020 | Smolenaers | |
| 11,088,550 | B2 | 8/2021 | Jaensch et al. | |
| 11,203,267 | B2 * | 12/2021 | Prasad | B60L 53/16 |
| 11,245,346 | B2 | 2/2022 | Chon et al. | |
| 11,351,875 | B2 * | 6/2022 | Chon | B60L 50/61 |
| 11,479,139 | B2 | 10/2022 | Smolenaers | |
| 11,569,745 | B2 * | 1/2023 | Prasad | B60L 53/24 |
| 12,283,905 | B2 * | 4/2025 | Smolenaers | H02M 7/487 |
| 2014/0070608 | A1 | 3/2014 | Achhammer et al. | |
| 2017/0361717 | A1 * | 12/2017 | Qin | B60L 53/11 |
| 2019/0372465 | A1 | 12/2019 | Xu et al. | |
| 2020/0361323 | A1 * | 11/2020 | Chon | B60L 50/61 |
| 2022/0302836 | A1 * | 9/2022 | Prasad | B60L 53/24 |
| 2023/0072024 | A1 | 3/2023 | Tremblay | |
| 2026/0005623 | A1 * | 1/2026 | Salmon | H02M 7/487 |

* cited by examiner

DC-DC BOOST SYSTEM AND METHODS FOR RECHARGING HIGHER VOLTAGE BATTERY PACKS WITH LESSER RATED CHARGING STATIONS

FIELD

The present application generally relates to electrified vehicle charging and, more particularly, to DC-DC boost systems and methods for recharging higher voltage battery packs with lesser rated charging stations.

BACKGROUND

An electrified vehicle includes one or more electric motors that generate propulsive drive torque using electrical energy (e.g., current) provided by one or more high voltage battery packs. There are two primary ways to charge a high voltage battery pack of an electrified vehicle: (1) alternating current (AC) on-board charging and (2) direct current (DC) fast charging (also known as “Mode 4”). There are dedicated vehicle components for supporting each charging technique. In the DC fast charging mode, the charging station is connected directly to the high voltage battery pack. Most installed DC charging stations are rated for 400 volts (400V), excluding specific highway DC charging stations. In order to charge higher voltage battery systems (e.g., 800V battery systems), electrified vehicles often include a DC boost charging module (DCBCM), which adds significant cost/space/weight and integration complexity to the electrified vehicle. Accordingly, while such conventional electrified vehicle charging systems and methods do work well for their intended purpose, there exists an opportunity for improvement in the relevant art.

SUMMARY

According to one example aspect of the invention, a direct current to direct current (DC-DC) boosting and fast charging system for an electrified vehicle is presented. In one exemplary implementation, the DC-DC boosting and fast charging system comprises an inverter electrically connected to a direct current (DC) power source and to an electric motor, configured to convert the DC power source into three phase alternating current (AC) power, and comprising three inductor phase legs configured to generate and output three AC phase currents, respectively, a plurality of relay switches electrically connected between the DC power source, the inverter, and a high voltage (HV) battery system rated at a first voltage, wherein at least one of the plurality of relay switches is connected to a midpoint of one of the three inductor phase legs of the inverter, and a controller configured to control a boosted fast charging mode wherein the DC power source is a DC charging station rated at a second voltage that is less than the first voltage and the plurality of relay switches are opened/closed such that the second voltage is provided to the inverter and to the HV battery system for recharging, wherein providing the second voltage to the inverter via the plurality of relay switches causes the inverter to generate and output one AC phase current that causes the electric motor to inductively generate and provide two AC phase currents back to the inverter, which are converted to a third DC voltage for further boosted recharging of the HV battery system.

In some implementations, the inverter includes an additional capacitor associated with the at least one relay switch of the plurality of relay switches connected to the midpoint of the one of the three inductor phase legs of the inverter. In some implementations, the plurality of relay switches includes five relay switches with one relay switch for each of positive voltage and ground and three relay switches connected to three midpoints of the three inductor phase legs of the inverter, respectively. In some implementations, the plurality of relay switches further includes one or more bypass relay switches for bypassing the inverter and electrically connecting the DC power source to the HV battery system. In some implementations, the controller is configured to control a normal operating mode wherein the DC power source is the HV battery system, the plurality of relay switches are open, and the inverter is configured to generate and output three AC phase currents that cause the electric motor to rotate and generate propulsive drive torque for the electrified vehicle.

In some implementations, the first voltage is approximately 800 volts and the second and third voltages are each approximately 400 to 500 volts. In some implementations, the controller is configured to control a non-boosted fast charging where wherein the DC power source is a DC charging station rated at a fourth voltage that is approximately equal to the first voltage and positive and negative relay switches of the plurality of relay switches are closed such that the fourth voltage is provided to the HV battery system for recharging. In some implementations, the first and fourth voltages are approximately 400 volts or 800 volts.

According to another example aspect of the invention, a DC-DC boosting and fast charging method for an electrified vehicle is presented. In one exemplary implementation, the method comprises providing an inverter electrically connected to a DC power source and to an electric motor, configured to convert the DC power source into three phase AC power, and comprising three inductor phase legs configured to generate and output three AC phase currents, respectively, providing a plurality of relay switches electrically connected between the DC power source, the inverter, and an HV battery system rated at a first voltage, wherein at least one of the plurality of relay switches is connected to a midpoint of one of the three inductor phase legs of the inverter, and controlling, by a controller of the electrified vehicle, a boosted fast charging mode wherein the DC power source is a DC charging station rated at a second voltage that is less than the first voltage and the plurality of relay switches are opened/closed such that the second voltage is provided to the inverter and to the HV battery system for recharging, wherein providing the second voltage to the inverter via the plurality of relay switches causes the inverter to generate and output one AC phase current that causes the electric motor to inductively generate and provide two AC phase currents back to the inverter, which are converted to a third DC voltage for further boosted recharging of the HV battery system.

In some implementations, the inverter includes an additional capacitor associated with the at least one relay switch of the plurality of relay switches connected to the midpoint of the one of the three inductor phase legs of the inverter. In some implementations, the plurality of relay switches includes five relay switches with one relay switch for each of positive voltage and ground and three relay switches connected to three midpoints of the three inductor phase legs of the inverter, respectively. In some implementations, the plurality of relay switches further includes one or more bypass relay switches for bypassing the inverter and electrically connecting the DC power source to the HV battery system. In some implementations, the method further comprises controlling, by the controller, a normal operating mode wherein the DC power source is the HV battery system, the plurality of relay switches are open, and the inverter is configured to generate and output three AC phase currents that cause the electric motor to rotate and generate propulsive drive torque for the electrified vehicle.

In some implementations, the first voltage is approximately 800 volts and the second and third voltages are each approximately 400 to 500 volts. In some implementations, the method further comprises controlling, by the controller, a non-boosted fast charging where wherein the DC power source is a DC charging station rated at a fourth voltage that is approximately equal to the first voltage and positive and negative relay switches of the plurality of relay switches are closed such that the fourth voltage is provided to the HV battery system for recharging. In some implementations, the first and fourth voltages are approximately 400 volts or 800 volts.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, most installed direct current (DC) electrified vehicle charging stations are rated for 400 volts (400V), excluding specific highway DC charging stations. In order to charge higher voltage battery systems (e.g., 800V battery systems), electrified vehicles often include a DC boost charging module (DCBCM), which adds significant cost/space/weight and integration complexity to the electrified vehicle. As a result, the present application is directed to improved systems and methods for recharging higher voltage battery systems (e.g., 800V battery systems) with lower rated DC charging stations (e.g., 400V charging stations) and without the need for the large and expensive DCBCM. These systems and methods utilize the electrified vehicle's existing inverter and electric motor(s)—the components typically generating propulsive drive torque—to perform the 400V-800V boost function. While 400V-800V is a common example in today's vehicles, the techniques could be applicable to other boost configurations (400V-1200V, 800V-1200V, etc.). The only additional componentry needed is a few switches/relays and a small DC capacitor. In some implementations, more switches/relays could also be added for balancing the boost current among the three phases for even further improved performance.

Figure 1:
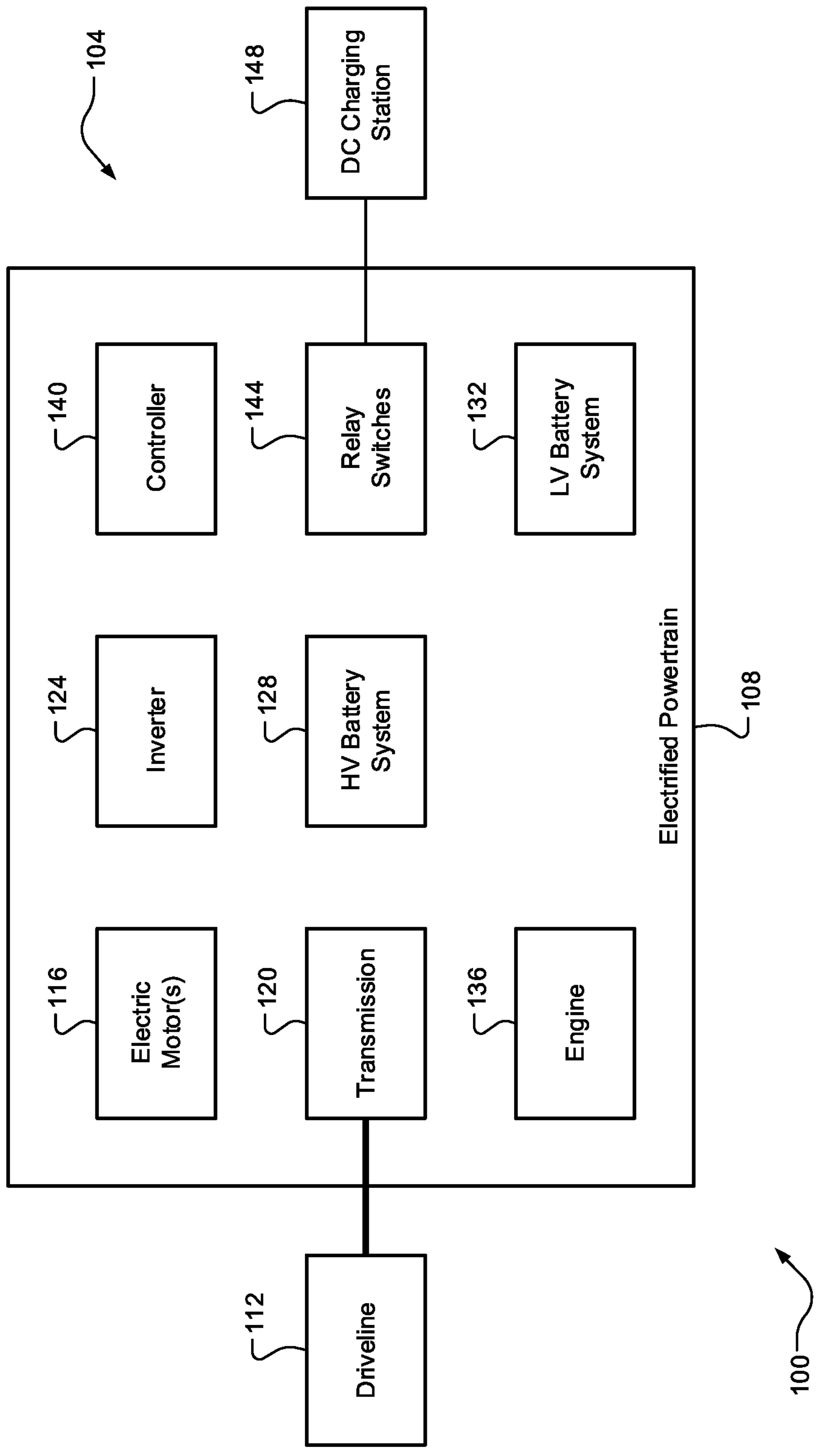
FIG. 1 is a functional block diagram of an electrified vehicle having an example direct current to direct current (DC-DC) boosting and fast charging system according to the principles of the present application.

Referring now to FIG. 1, a functional block diagram of an electrified vehicle 100 having an example direct current (DC) boosting and fast charging system 104 according to the principles of the present application is illustrated. The electrified vehicle 100 could have any suitable configuration, including, but not limited to, a battery electric vehicle (BEV) and a plug-in hybrid electric vehicle (PHEV). The electrified vehicle 100 includes an electrified powertrain 108 configured to generate and transfer drive torque to a driveline 112 for vehicle propulsion. The electrified powertrain 108 includes one or more electric motors 116, also known as electric traction motors because they are configured to generate propulsive traction torque, which is then transferred to the driveline 112 via a transmission 120 (e.g., an automatic transmission). The electric motor(s) 116 are configured to generate mechanical energy (drive torque) using three alternating current (AC) phase currents provided by an inverter 124, also known as a traction inverter. The inverter 124 converts a direct current (DC) input current from a DC power source, such as a high voltage (HV) battery system 128, into the three AC phase currents corresponding to three inductor phase legs (not shown), respectively, which are described in greater detail below. The electrified vehicle 100 also includes a low voltage (LV) battery system 132 (e.g., a 12 volt, or 12V battery system) configured to power low voltage components such as accessory loads of the electrified vehicle 100.

The electrified powertrain 108 could optionally include an internal combustion engine 136 configured to combust a mixture of air and fuel (gasoline, diesel, etc.) to generate mechanical energy (drive torque) that could be utilized for vehicle propulsion and/or for recharging the battery systems 128, 132. A controller 140 controls operation of the electrified vehicle 100 and, more particularly, the electrified powertrain 108 (e.g., to meet or satisfy a driver or operator torque request), including specific components for recharging control as described in greater detail below. The electrified powertrain 108 also includes a plurality of relay switches 144 as part of the DC-DC boosting and fast charging system 104 according to the principles of the present application. In one configuration (also referred to herein as "a non-boosted fast charging mode"), the relay switches 144 are configured to bypass the inverter 124 such that an external DC charging station 148 is directly connected to the HV battery system 128. In another configuration (also referred to herein as "a boosted fast charging mode"), some of the relay switches 144 are configured to connect the external DC charging station 148 to a midpoint of one inductor phase leg (not shown) of the inverter 124, which causes the powered inductor phase leg to generate AC phase currents in the other two inductor phase legs (not shown) and output a DC voltage for further (boosted) recharging of the HV battery system 128.

Figure 2A:
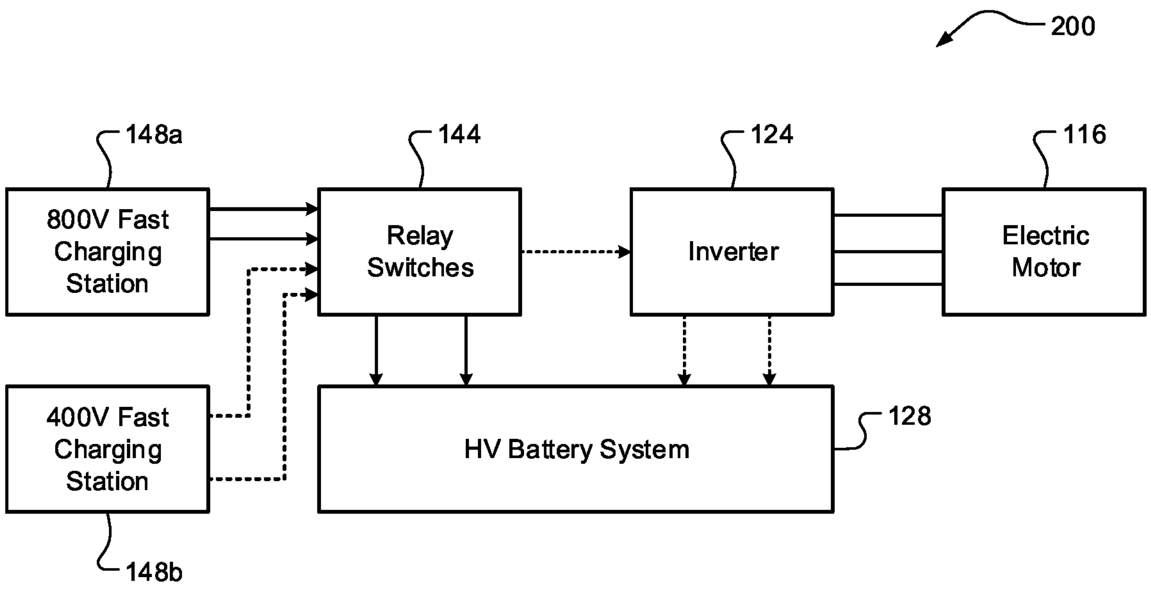
FIGS. 2A-2B are functional block diagrams of example configurations of the DC-DC boosting and fast charging system according to the principles of the present application.
Figure 2B:
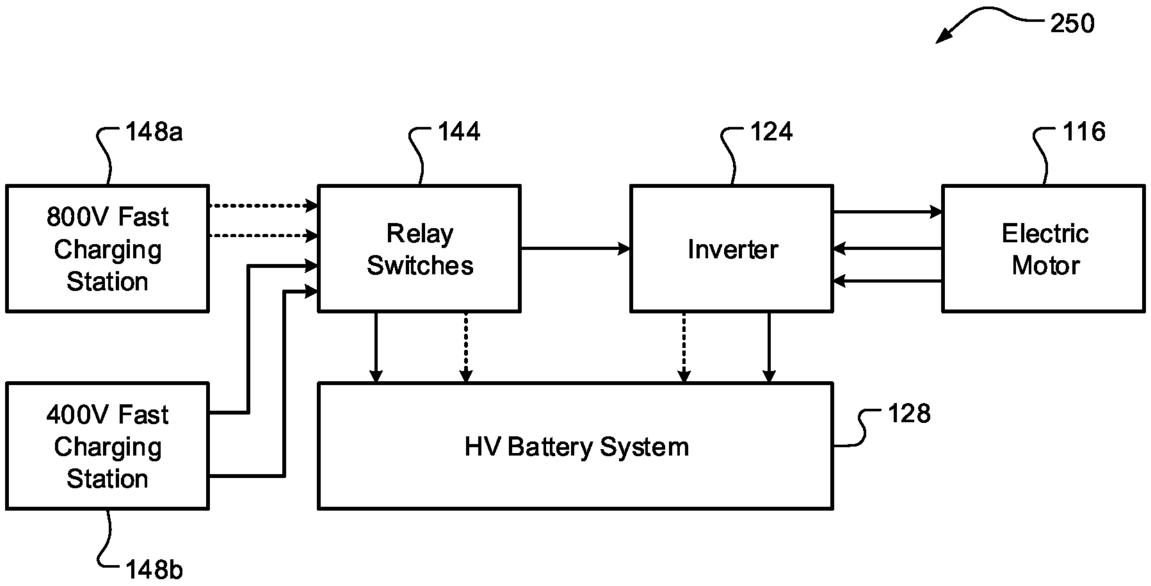

Referring now to FIGS. 2A-2B and with continued reference to FIG. 1, functional block diagrams of example architectures 200, 250 for the DC-DC boosting and fast charging system 104 according to the principles of the present application are illustrated. As shown, two examples of the DC charging station 148 are shown—an 800V (high voltage) fast charging station 148*a* and a 400V (low voltage) fast charging station 148*b*—for an 800V rating of the HV battery system 128. It will be appreciated that there are merely two examples and other voltage configurations for the DC charging station 148 and the HV battery system 128) could be utilized (an 800V HV battery system with 400V/1200V DC fast charging stations, a 1200V HV battery system with 800V/1200V DC fast charging stations, etc.). In FIG. 2A, charging via the 800V fast charging station 148*a* is occurring. The relay switches 144 are set (e.g., by the controller 140) to bypass the inverter 128 and to directly charge the HV battery system 128. In FIG. 2B, on the other hand, boosted charging via the 400V DC fast charging station 148*a* is occurring. The relay switches 144 are set (e.g., by the controller 140) such that ~400-500V is provided directly to the HV battery system 128 and DC voltage is also provided to the inverter 124. The inverter 124 and the electric motor 116 (e.g., via on AC phase current) collectively boost the provided DC voltage such that additional boosting DC voltage is provided via the inverter 124 to the HV battery system 128, resulting in approximately 800V DC or more being provided to the HV battery system 128 for fast charging via only the 400V fast charging station 148*b*.

Figure 3A:
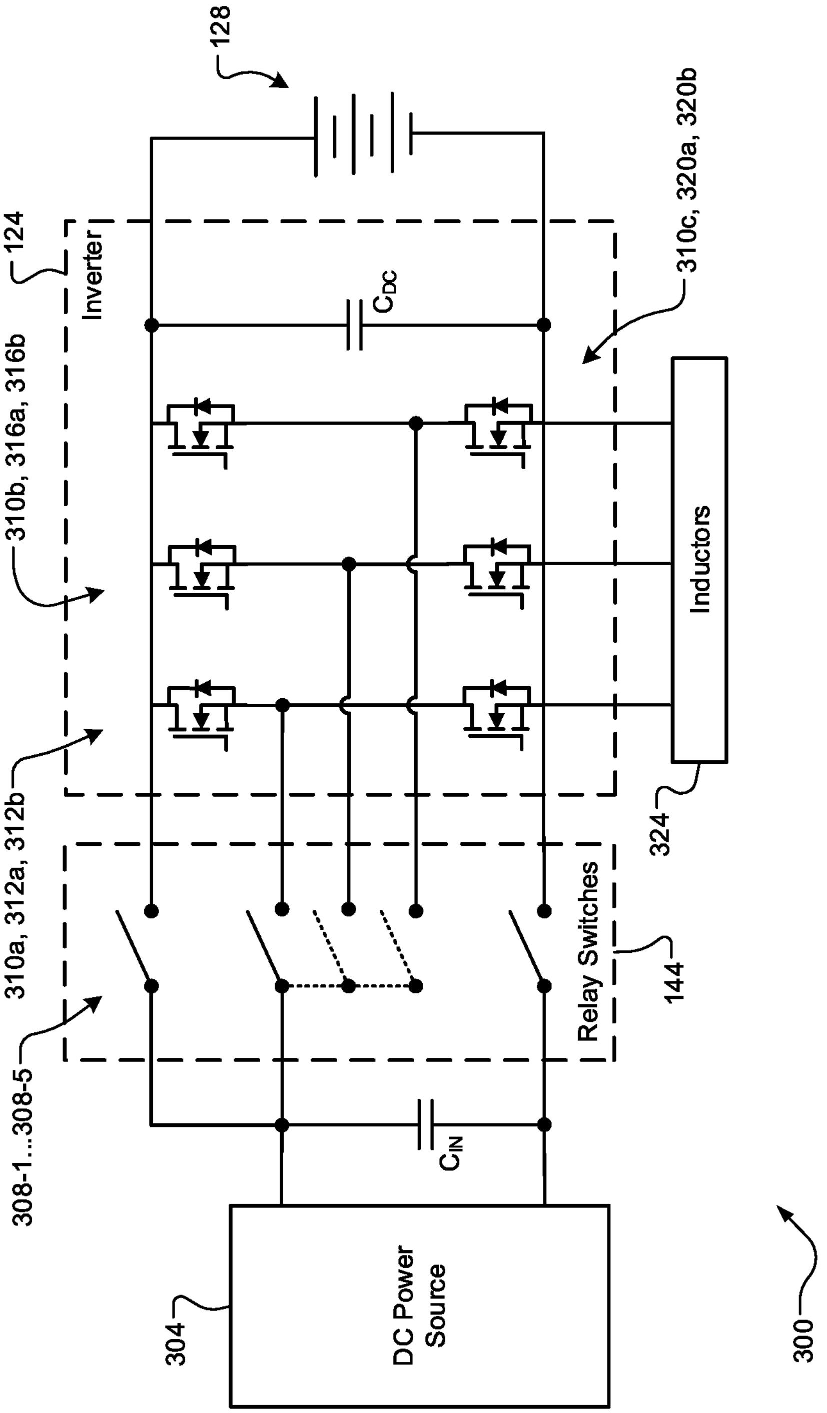
FIGS. 3A-3C are circuit diagrams of example architectures for the DC-DC boosting and fast charging system according to the principles of the present application.
Figure 3B:
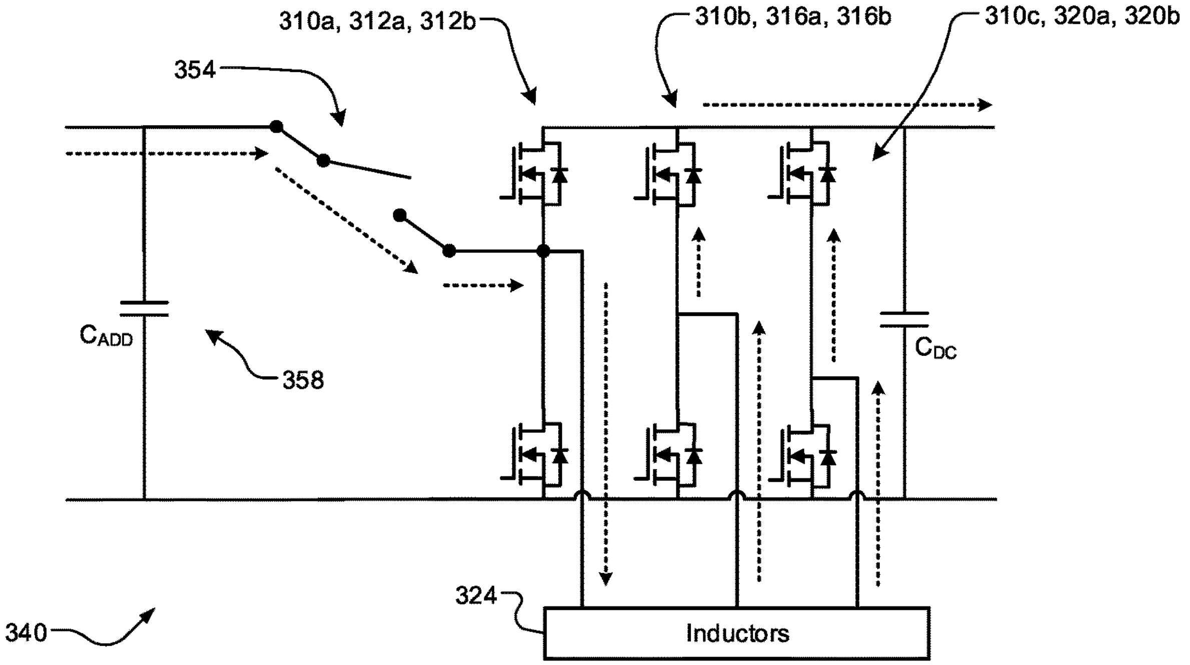
Figure 3C:
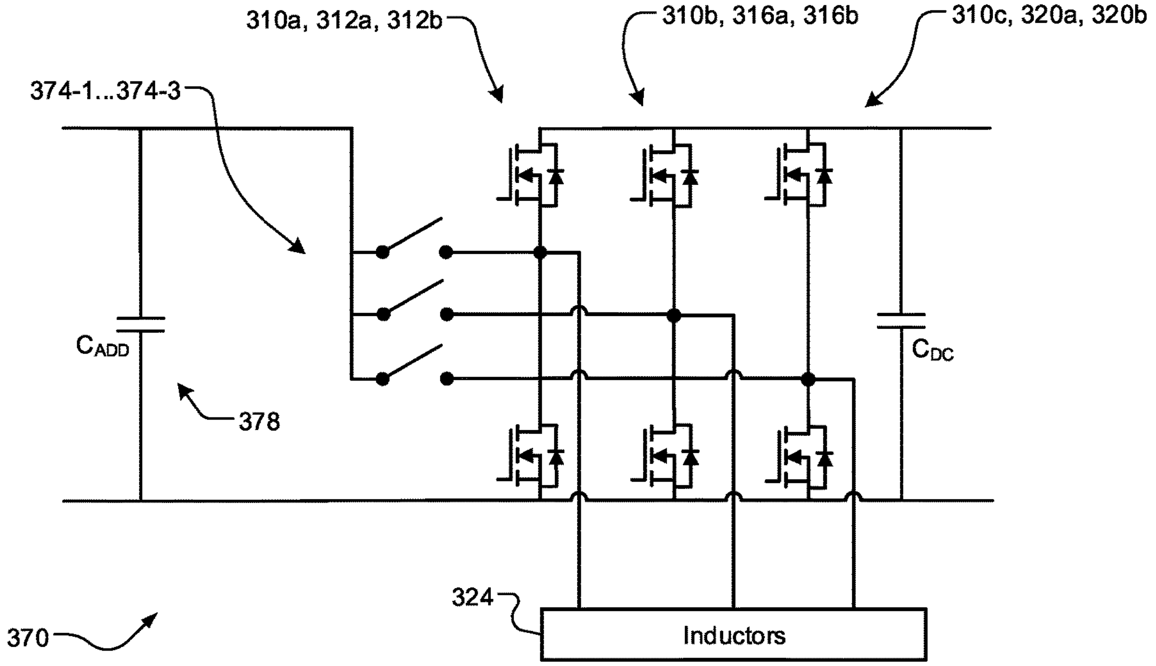

Referring now to FIGS. 3A-3C and with continued reference to FIG. 1 and FIGS. 2A-2B, circuit diagrams of example architectures 300, 340, 370 for the DC-DC boosting and fast charging system 104 according to the principles of the present application are illustrated. In architecture 300 of FIG. 3A, a DC power source 304 (the HV battery system 128, the charging station 148, etc.) provides a DC input voltage (e.g., 800V DC) across positive and ground terminals with an inherent input capacitance $C_{IN}$ therebetween. The relay switches 144 are shown to include five relay switches 308-1 . . . 308-5 connected to a positive bus, a ground bus, and to the three midpoints of three "inductor phase legs" of the inverter 124 with the HV battery system 128 arranged on its opposing/far side with an inherent output capacitance CDC. More specifically, the inverter 124 includes three paths 310*a*, 310*b*, and 310*c* each having two transistors (e.g., metal-oxide semiconductor field-effect transistors, or MOSFETs) 312*a* and 312*b*, 316*a* and 316*b*, and 320*a* and 320*b*, with an inductor of a plurality of inductors 324 (e.g., of the electric motor 116) at a bottom of each path (hence, three inductor phase legs 310*a*, 310*b*, and 310*c*). The inductors 324 could be arranged in either a Y-configuration or a delta-configuration commonly associated with electric motors.

In architecture 340 of FIG. 3B, the positive input of the DC charging station 148 is connected via one of the relay switches 144 (relay switch 354) and a small additional DC capacitor $C_{ADD}$ 358 is added. This relay switch 354 and capacitor $C_{ADD}$ could be packaged anywhere within the inverter 124 or outside of the inverter 124 for maximum flexibility. In addition, they may not be needed at all if components external to the inverter 124 already provide for the same functionality. For example, the architecture 300 of FIG. 3A covers this functionality as well as further functionality as described below. The relay switch 354 connects the positive input of the DC charging station 148 to the midpoint of the first inductor phase leg between transistors 312*a* and 312*b*. The flow of electrical current therethrough is illustrated by the dotted/dashed line, which flows down through the first inductor phase leg into the inductors 324 (i.e., electric motor 116) and back from the inductors 324 through the remaining two inductor phase legs of the inverter 124 thereby providing boosted DC voltage at the HV battery system 128 for charging/recharging. In architecture 370 of FIG. 3C, which is overall similar to the configuration 340 of FIG. 3B, three of the relay switches 144 (relay switches 374-1 . . . 374-3) could be provided (along with small additional capacitor $C_{ADD}$ 378), also described as "one relay switch per phase." These relay switches 374-1 . . . 374-3 connect the positive input of the DC charging station 148 to the respective three midpoint nodes (between transistors 312*a*/312*b*, 316*a*/316*b*, and 320*a*/320*c*) to provide for boost current balancing amongst the three phases. This could, for example only, enable a higher power rating for the boost charging function.

Figure 4:
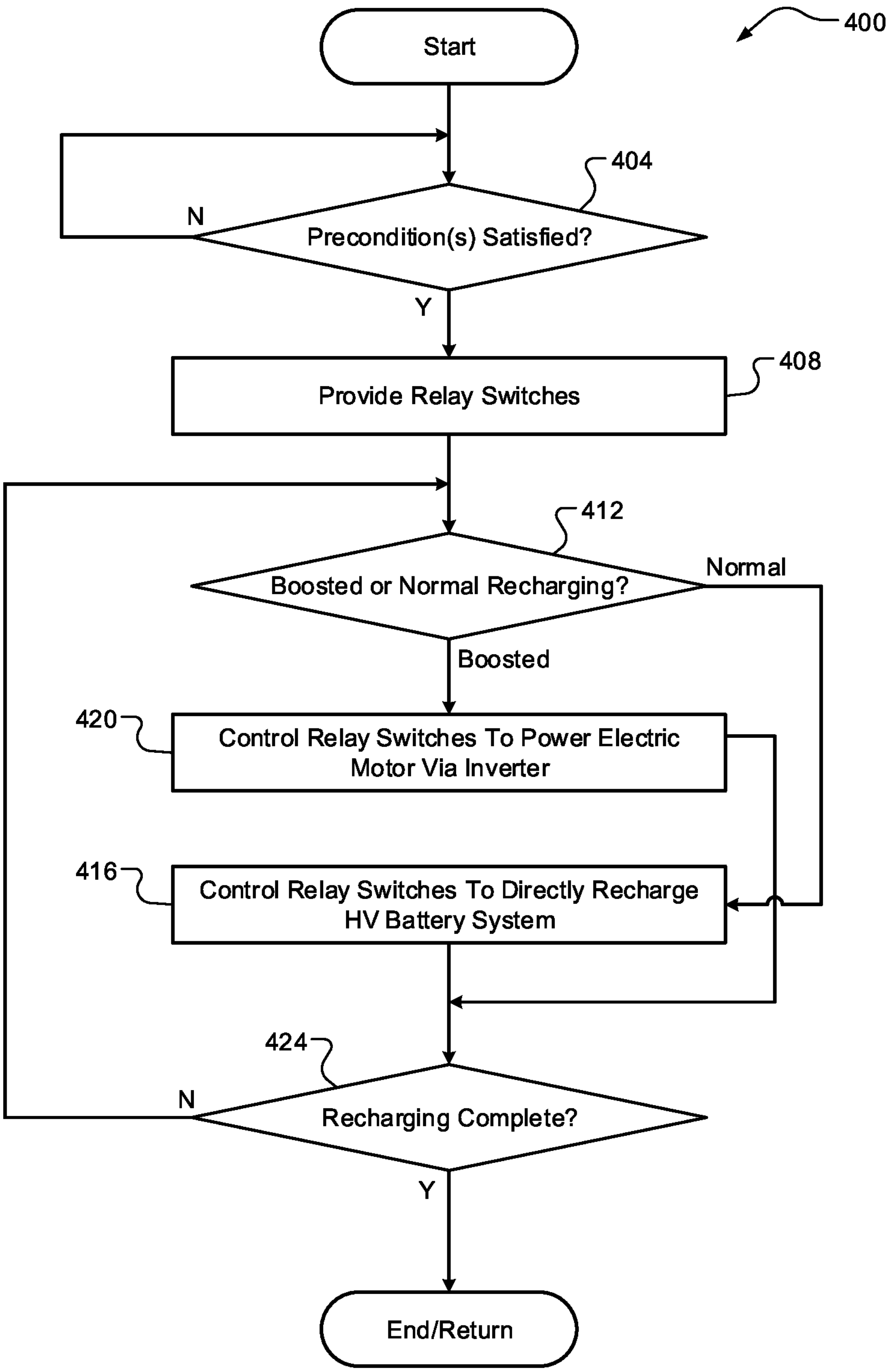
FIG. 4 is a flow diagram of an example DC-DC boosting and fast charging method for an electrified vehicle according to the principles of the present application.

Referring now to FIG. 4, a flow diagram of an example DC-DC boosting and fast charging method 400 for an electrified vehicle according to the principles of the present application is illustrated. While the components of the electrified vehicle 100 are specifically referenced for descriptive/illustrative purposes, it will be appreciated that the method 400 could be applicable to any suitable electrified vehicle having a rechargeable HV battery system. At 404, the controller 140 determines whether a set of one or more preconditions are satisfied. These precondition(s) could include, for example only, the electrified vehicle 100 being ready for charging and no malfunctions/faults being present. When false, the method 400 ends or returns to 404. When true, the method 400 proceeds to 408 where the relay switches 144 are provided. At 412, the controller 140 determines whether boosted or normal DC-DC charging is set to occur. For normal charging, the method 400 proceeds to 416 where the controller 140 controls the relay switches 144 such that the HV battery system 128 is directly charged by the DC charging station 148 and the method 400 then proceeds to 424. For boost charging (after 412), the method 400 proceeds to 420 where the controller 140 controls the relay switches 144 such that the HV battery system 128 is boost charged using the charging station 148 along with the inverter 124 and the electric motor 116 (for boosting) and the method 400 then proceeds to 424. At 424, the controller 140 determines whether charging/recharging of the HV battery system 128 is complete (e.g., has reached a target state of charge, or SOC). When false, the method 400 returns to 412 where charging/recharging continues. When true, however, the method 400 ends (and the driver/operator can disconnect the electrified vehicle 100 from the charging station 148 and resume his/her trip) or returns to 404 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A direct current to direct current (DC-DC) boosting and fast charging system for an electrified vehicle, the DC-DC boosting and fast charging system comprising:

an inverter electrically connected to a direct current (DC) power source and to an electric motor, configured to convert the DC power source into three phase alternating current (AC) power, and comprising three inductor phase legs configured to generate and output three AC phase currents, respectively;

a plurality of relay switches electrically connected between the DC power source, the inverter, and a high voltage (HV) battery system rated at a first voltage, wherein at least one of the plurality of relay switches is connected to a midpoint of one of the three inductor phase legs of the inverter; and a controller configured to control a boosted fast charging mode wherein the DC power source is a DC charging station rated at a second voltage that is less than the first voltage and the plurality of relay switches are opened/closed such that the second voltage is provided to the inverter and to the HV battery system for recharging, wherein providing the second voltage to the inverter via the plurality of relay switches causes the inverter to generate and output one AC phase current that causes the electric motor to inductively generate and provide two AC phase currents back to the inverter, which are converted to a third DC voltage for further boosted recharging of the HV battery system.

2. The DC-DC boosting and fast charging system of claim 1, wherein the inverter includes an additional capacitor associated with the at least one relay switch of the plurality of relay switches connected to the midpoint of the one of the three inductor phase legs of the inverter.

3. The DC-DC boosting and fast charging system of claim 2, wherein the plurality of relay switches includes five relay switches with one relay switch for each of positive voltage and ground and three relay switches connected to three midpoints of the three inductor phase legs of the inverter, respectively.

4. The DC-DC boosting and fast charging system of claim 3, wherein the plurality of relay switches further includes one or more bypass relay switches for bypassing the inverter and electrically connecting the DC power source to the HV battery system.

5. The DC-DC boosting and fast charging system of claim 1, wherein the controller is configured to control a normal operating mode wherein the DC power source is the HV battery system, the plurality of relay switches are open, and the inverter is configured to generate and output three AC phase currents that cause the electric motor to rotate and generate propulsive drive torque for the electrified vehicle.

6. The DC-DC boosting and fast charging system of claim 1, wherein the first voltage is approximately 800 volts and the second and third voltages are each approximately 400 to 500 volts.

7. The DC-DC boosting and fast charging system of claim 1, wherein the controller is configured to control a non-boosted fast charging where wherein the DC power source is a DC charging station rated at a fourth voltage that is approximately equal to the first voltage and positive and negative relay switches of the plurality of relay switches are closed such that the fourth voltage is provided to the HV battery system for recharging.

8. The DC-DC boosting and fast charging system of claim 7, wherein the first and fourth voltages are approximately 400 volts or 800 volts.

9. A direct current to direct current (DC-DC) boosting and fast charging method for an electrified vehicle, the method comprising:

providing an inverter electrically connected to a direct current (DC) power source and to an electric motor, configured to convert the DC power source into three phase alternating current (AC) power, and comprising three inductor phase legs configured to generate and output three AC phase currents, respectively;

providing a plurality of relay switches electrically connected between the DC power source, the inverter, and a high voltage (HV) battery system rated at a first voltage, wherein at least one of the plurality of relay switches is connected to a midpoint of one of the three inductor phase legs of the inverter; and controlling, by a controller of the electrified vehicle, a boosted fast charging mode wherein the DC power source is a DC charging station rated at a second voltage that is less than the first voltage and the plurality of relay switches are opened/closed such that the second voltage is provided to the inverter and to the HV battery system for recharging, wherein providing the second voltage to the inverter via the plurality of relay switches causes the inverter to generate and output one AC phase current that causes the electric motor to inductively generate and provide two AC phase currents back to the inverter, which are converted to a third DC voltage for further boosted recharging of the HV battery system.

10. The method of claim 9, wherein the inverter includes an additional capacitor associated with the at least one relay switch of the plurality of relay switches connected to the midpoint of the one of the three inductor phase legs of the inverter.

11. The method of claim 10, wherein the plurality of relay switches includes five relay switches with one relay switch for each of positive voltage and ground and three relay switches connected to three midpoints of the three inductor phase legs of the inverter, respectively.

12. The method of claim 11, wherein the plurality of relay switches further includes one or more bypass relay switches for bypassing the inverter and electrically connecting the DC power source to the HV battery system.

13. The method of claim 9, further comprising controlling, by the controller, a normal operating mode wherein the DC power source is the HV battery system, the plurality of relay switches are open, and the inverter is configured to generate and output three AC phase currents that cause the electric motor to rotate and generate propulsive drive torque for the electrified vehicle.

14. The method of claim 9, wherein the first voltage is approximately 800 volts and the second and third voltages are each approximately 400 to 500 volts.

15. The method of claim 9, further comprising controlling, by the controller, a non-boosted fast charging where wherein the DC power source is a DC charging station rated at a fourth voltage that is approximately equal to the first voltage and positive and negative relay switches of the plurality of relay switches are closed such that the fourth voltage is provided to the HV battery system for recharging.

16. The method of claim 15, wherein the first and fourth voltages are approximately 400 volts or 800 volts.

* * * * *